United States Patent
Kim et al.

(10) Patent No.: US 12,033,052 B2
(45) Date of Patent: Jul. 9, 2024

(54) LATENCY PREDICTION METHOD AND COMPUTING DEVICE FOR THE SAME

(71) Applicant: NOTA, INC., Daejeon (KR)

(72) Inventors: Jeong Ho Kim, Guri-si (KR); Min Su Kim, Seoul (KR); Tae Ho Kim, Seoul (KR)

(73) Assignee: NOTA, INC., Daejeon (KR)

( * ) Notice: Subject to any disclaimer, the term of this patent is extended or adjusted under 35 U.S.C. 154(b) by 41 days.

(21) Appl. No.: 17/819,281

(22) Filed: Aug. 11, 2022

(65) Prior Publication Data
US 2023/0050247 A1 Feb. 16, 2023

(30) Foreign Application Priority Data

Aug. 12, 2021 (KR) .................. 10-2021-0106527
Jul. 29, 2022 (KR) .................. 10-2022-0094417

(51) Int. Cl.
- *G06N 3/04* (2023.01)
- *G06N 3/045* (2023.01)
- *G06N 3/08* (2023.01)
- *G06N 20/20* (2019.01)

(52) U.S. Cl.
CPC .................. *G06N 3/04* (2013.01); *G06N 3/08* (2013.01); *G06N 20/20* (2019.01); *G06N 3/045* (2023.01)

(58) Field of Classification Search
CPC .. G06N 3/00; G06N 3/02; G06N 3/04; G06N 3/045; G06N 3/08; G06N 3/082; G06N 20/00; G06N 20/10; G06N 20/20
See application file for complete search history.

(56) References Cited

U.S. PATENT DOCUMENTS

2021/0342193 A1* 11/2021 Anand ................ G06F 11/3447

FOREIGN PATENT DOCUMENTS

| KR | 10-2020-0109917 A | 9/2020 |
| KR | 10-2021-0073242 A | 6/2021 |

OTHER PUBLICATIONS

Office Action for KR10-2022-0094417 by Korean Intellectual Property Office dated Nov. 29, 2022.
Matthias Wess et al., "ANNETTE: Accurate Neural Network Execution Time." Estimation With Stacked Models, arXiv:2105.03176v1 [cs.LG] May 7, 2021 (May 7, 2021.).

* cited by examiner

*Primary Examiner* — Shane D Woolwine
(74) *Attorney, Agent, or Firm* — BROADVIEW IP LAW, PC

(57) ABSTRACT

Provided are a latency prediction method and a computing device for the same. The latency prediction method includes receiving a deep learning model and predicting on-device latency of the received deep learning model using a latency predictor which is trained on the basis of a latency lookup table. The latency lookup table includes information on single neural network layers and latency information of the single neural network layers on an edge device.

19 Claims, 12 Drawing Sheets

FIG. 5

EDGE DEVICE A

| SINGLE-NEURAL-NETWORK-LAYER DEEP LEARNING MODEL INFORMATION | LATENCY(ms) |
|---|---|
| DEEP LEARNING MODEL INFORMATION OF NEURAL NETWORK LAYER 1 | 17.581 |
| DEEP LEARNING MODEL INFORMATION OF NEURAL NETWORK LAYER 2 | 2.896 |
| DEEP LEARNING MODEL INFORMATION OF NEURAL NETWORK LAYER 3 | 25.162 |
| ... | ... |

LATENCY PREDICTION METHOD AND COMPUTING DEVICE FOR THE SAME

CROSS-REFERENCE TO RELATED APPLICATION(S)

This application is based on and claims priority under 35 U.S.C. § 119 to Korean Patent Application No. 10-2021-0106527, files on Aug. 12, 2021, in the Korean Intellectual Property Office, and Korean Patent Application No. 10-2022-0094417, filed on Jul. 29, 2022, in the Korean Intellectual Property Office, the disclosure of which is incorporated by reference herein in its entirety.

BACKGROUND

1. Field of the Invention

The present disclosure relates to a method and system for predicting the latency of a deep learning model.

2. Discussion of Related Art

Although current deep learning models are run by receiving data from cloud servers, an on-device artificial intelligence (AI) technology that allows inexpensive devices to make inferences is necessary for data security issues and low-cost service.

Here, to determine whether a created deep learning model can make an inference in real time on a desired edge device, it is necessary to install and run the deep learning model on the device in practice.

However, to run a deep learning model on an edge device and measure the latency as the inference speed of the deep learning model, a great deal of time is required for setting the edge device and building pipelines. Accordingly, there is a problem that the entry barrier is high for people without hardware knowledge.

Also, a large number of deep learning models may be created depending on which neural network layers, such as a convolution layer, a pooling layer, etc., will be used and how settings will be made in detail for each neural network layer. Further, latency notably varies depending on an edge device on which the deep learning model is run. Therefore, it is difficult to accurately predict the on-device latency of a specific model.

SUMMARY OF THE INVENTION

The present disclosure is directed to providing a latency prediction method and system for predicting the on-device latency of a deep learning model without having to set an edge device and construct pipelines in practice.

However, the above object is exemplary, and the scope of the present disclosure is not limited thereto.

According to an aspect of the present disclosure, there is provided a latency prediction method performed by a computing device including at least one processor, the latency prediction method including receiving, by the at least one processor, a deep learning model and predicting, by the at least one processor, on-device latency of the received deep learning model using a latency predictor which is trained on the basis of a latency lookup table. The latency lookup table includes information on single neural network layers and latency information of the single neural network layers on an edge device.

In the latency lookup table, latency of single-neural-network-layer deep learning models measured on the edge device and information on the single-neural-network-layer deep learning models may be stored in association with each other.

The latency lookup table may be generated by compiling the single-neural-network-layer deep learning models by considering the edge device, receiving latency of the compiled single-neural-network-layer deep learning models measured on the edge device, and storing the latency in the latency lookup table in association with information on the single-neural-network-layer deep learning models.

The latency lookup table may be generated to store latency of each of a plurality of single-neural-network-layer deep learning models on each type of edge device.

The trained latency predictor may be trained based on a preprocessed latency value of the latency lookup table and a preprocessed output value of the latency predictor so that the trained latency predictor does not output a negative value.

The predicting of the on-device latency may include generating single-neural-network-layer deep learning models by dividing the received deep learning model into single neural network layers, generating predicted latency values on the edge device by inputting each of the single-neural-network-layer deep learning models, and calculating the latency of the received deep learning model by adding the predicted latency values of the single-neural-network-layer deep learning models.

The trained latency predictor may include a regression analysis model using a boosting algorithm.

The predicting of the on-device latency may include acquiring a predicted latency value of each of a plurality of single neural network layers included in the received deep learning model using the trained latency predictor, and the latency prediction method may further include identifying a first single neural network layer about which information is not included in the latency lookup table among the plurality of single neural network layers and additionally storing the information on the first single neural network layer and a predicted latency value of the first single neural network layer in the latency lookup table.

According to another aspect of the present disclosure, there is provided a computer program stored on a computer-readable recording medium to cause a computing device to perform the latency prediction method.

According to another aspect of the present disclosure, there is provided a computer-readable recording medium on which a program for causing a computing device to perform the latency prediction method.

According to another aspect of the present disclosure, there is provided a computing device including at least one processor implemented to execute instructions readable by a computing device. The at least one processor receives a deep learning model and predicts on-device latency of the received deep learning model using a latency predictor which is trained on the basis of a latency lookup table. The latency lookup table includes information on single neural network layers and latency information of the single neural network layers on an edge device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other objects, features, and advantages of certain embodiments of the disclosure will be more apparent

FIG. 5 is a diagram illustrating an example of a latency lookup table according to an exemplary embodiment of the present disclosure;

DETAILED DESCRIPTION OF EXEMPLARY EMBODIMENTS

Figure 1:
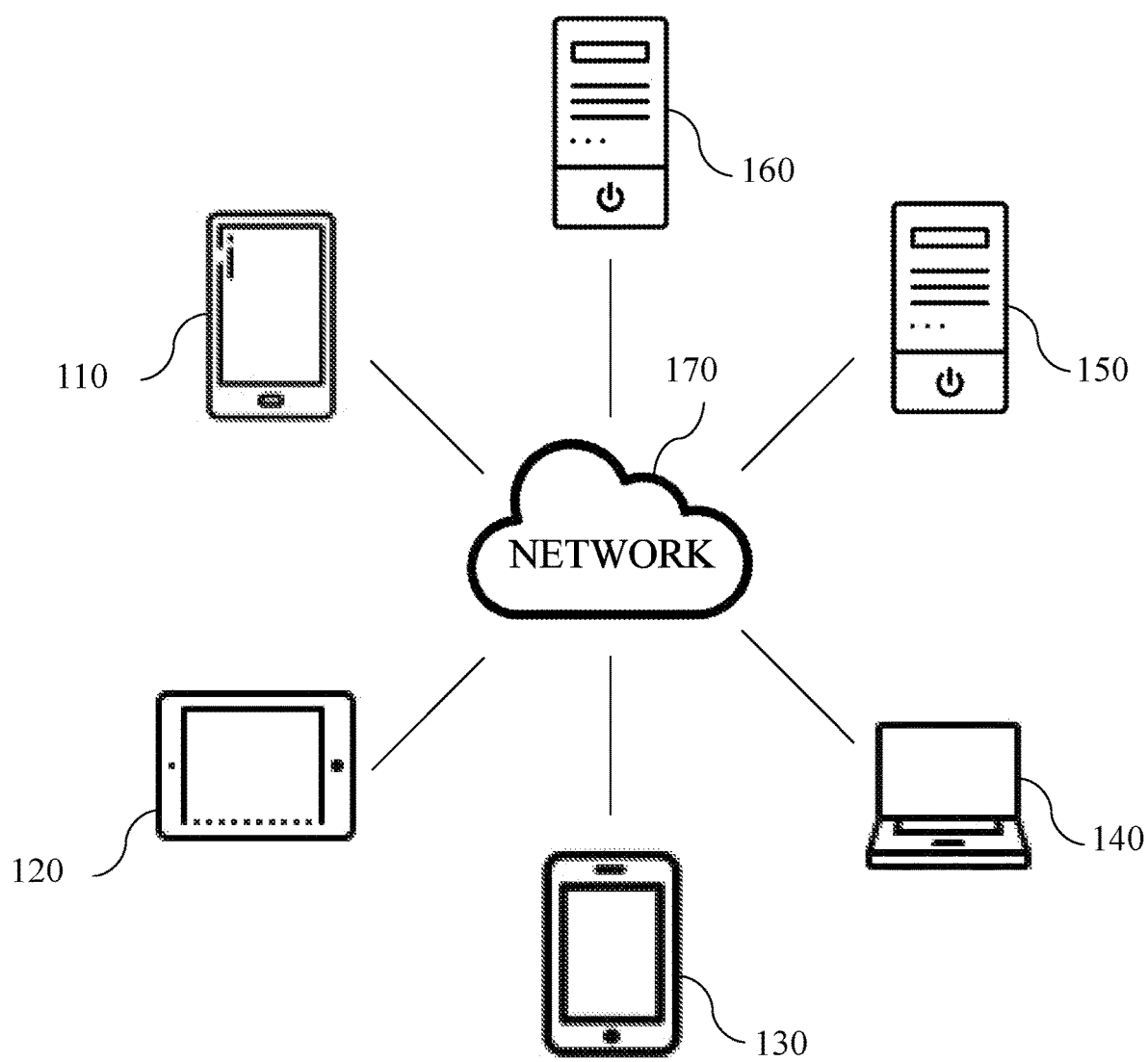
FIG. 1 is a diagram illustrating an example of a network environment according to an exemplary embodiment of the present disclosure.

Embodiments of the disclosure will be described in detail hereafter. One or more example embodiments have been illustrated in the drawings throughout which same or similar reference numerals refer to same or similar elements or elements having same or similar functions. The example embodiments described hereafter with reference to the drawings are illustrative, merely used for explaining the disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the purpose, technical solutions and advantages of the disclosure clearer, the following example embodiments are described in detail with reference to the accompanying drawings. The following description of the example embodiments are not intended to limit the scope of the inventive concept unless defined by the claims.

A latency prediction system according to exemplary embodiments of the present disclosure may be implemented by at least one computing device. On the computing device, a computer program in accordance with an exemplary embodiment of the present disclosure may be installed and run, and the computing device may perform a latency prediction method according to exemplary embodiments of the present disclosure under the control of the running computer program. The foregoing computer program may be stored on a computer-readable recording medium to be combined with a computer and cause the computer to perform the latency prediction method.

FIG. 1 is a diagram illustrating an example of a network environment according to an exemplary embodiment of the present disclosure. The network environment of FIG. 1 shows an example including a plurality of electronic devices 110, 120, 130, and 140, a plurality of servers 150 and 160, and a network 170. FIG. 1 is an example illustrating the present disclosure, and the number of electronic devices or the number of servers is not limited to that shown in FIG. 1. Also, the network environment of FIG. 1 merely illustrates an example of environments that are applicable to exemplary embodiments, and environments applicable to exemplary embodiments are not limited to the network environment of FIG. 1.

The plurality of electronic devices 110, 120, 130, and 140 may be fixed terminals or mobile terminals that are implemented as computing devices. Examples of the plurality of electronic devices 110, 120, 130, and 140 may be a smartphone, a cellular phone, a navigation device, a computer, a laptop computer, a digital broadcast terminal, a personal digital assistant (PDA), a portable multimedia player (PMP), a tablet personal computer (PC), etc. As an example, FIG. 1 shows the shape of a smartphone as an example of the electronic device 110, but in exemplary embodiments of the present disclosure, the electronic device 110 may be one of various physical computing devices that may substantially communicate with the other electronic devices 120, 130, and 140 and/or the servers 150 and 160 through the network 170 using a wireless or wired communication method.

There are no limitations on the communication method, which may not be only a communication method using a communication network (e.g., a mobile communication network, wired Internet, wireless Internet, a broadcast network) that may be included in the network 170 but may also be a short-range wireless communication method between devices. For example, the network 170 may include at least one of a personal area network (PAN), a local area network (LAN), a campus area network (CAN), a metropolitan area network (MAN), a wide area network (WAN), a broadband network (BBN), the Internet, etc. Also, the network 170 may include at least one of network topologies including a bus network, a start network, a ring network, a mesh network, a star-bus network, a tree or hierarchical network, etc., but is not limited thereto.

Each of the servers 150 and 160 may be implemented as a computing device or a plurality of computing devices that provide instructions, code, files, content, services, etc. in communication with the plurality of electronic devices 110, 120, 130, and 140. For example, the server 150 may be a system that provides a service (e.g., an instant messaging service, a social networking service, a payment service, a virtual exchange service, a risk monitoring service, a game service, a group call service (or a voice conference service), a messaging service, a mail service, a map service, a translation service, a financial service, a search service, a content provision service, etc.) to the plurality of electronic devices 110, 120, 130, and 140 that access the server 150 through the network 170.

Figure 2:
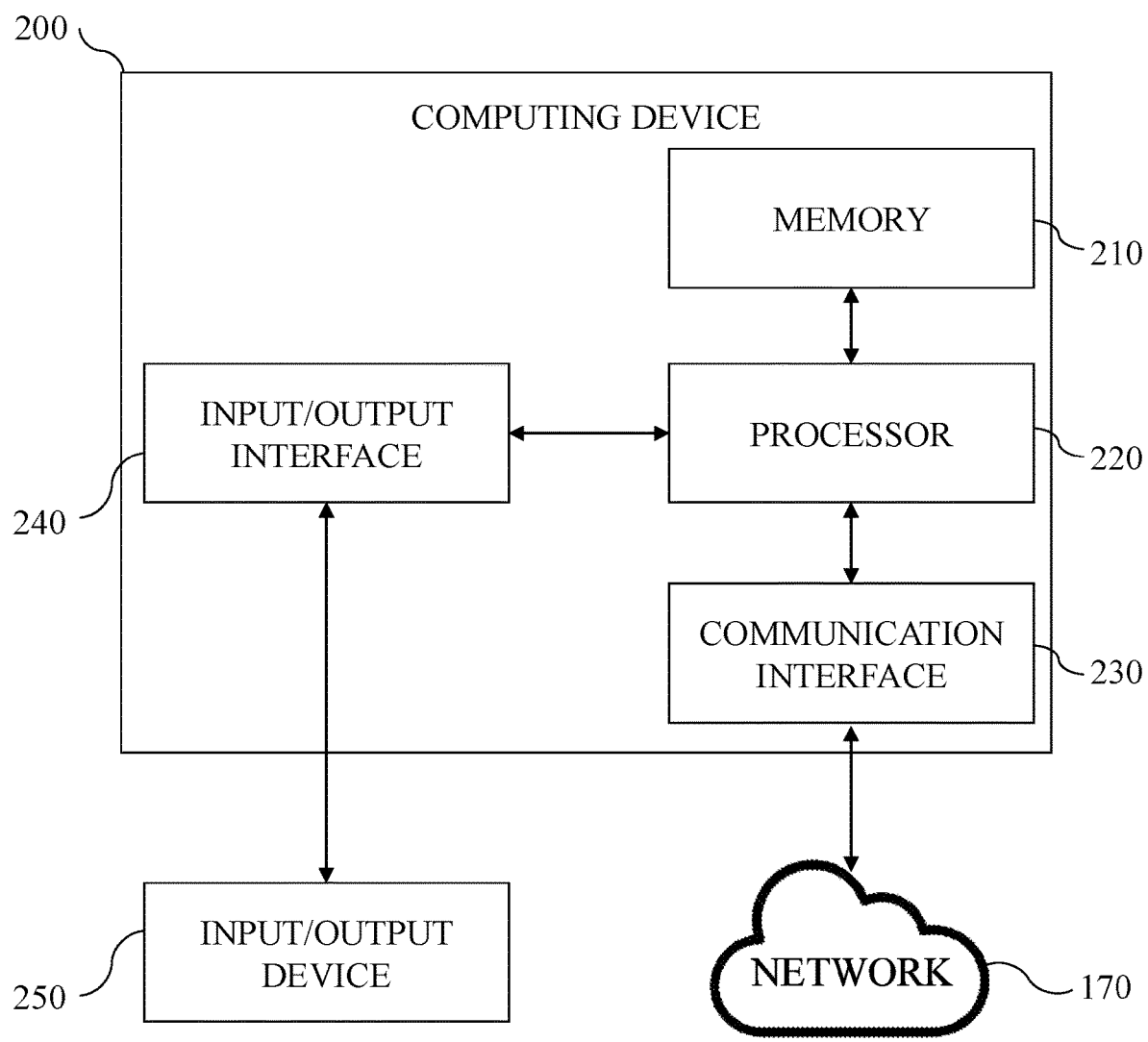
FIG. 2 is a block diagram illustrating an example of a computing device according to an exemplary embodiment of the present disclosure.

FIG. 2 is a block diagram illustrating an example of a computing device according to an exemplary embodiment of the present disclosure. Each of the plurality of electronic devices 110, 120, 130, and 140 or the servers 150 and 160 described above may be implemented by a computing device 200 shown in FIG. 2.

As shown in FIG. 2, the computing device 200 may include a memory 210, a processor 220, a communication interface 230, and an input/output interface 240. The memory 210 is a computer-readable recording medium and may include a random access memory (RAM) and permanent mass storage devices such as a read only memory (ROM) and a disk drive. The permanent mass storage devices, such as a ROM and a disk drive, may be included in the computing device 200 as a separate permanent storage device distinguished from the memory 210. Also, the memory 210 may store an operating system and at least one piece of program code. Such software components may be loaded from a computer-readable recording medium which is separate from the memory 210 into the memory 210. The separate computer-readable recording medium may include a floppy drive, a disk, tape, a digital versatile disc (DVD)/compact disc ROM (CD-ROM) drive, a memory card, etc. According to another exemplary embodiment, the software components may be loaded into the memory 210 not from a computer-readable recording medium but through the communication interface 230. For example, the software components may be loaded into the memory 210 of the computing device 200 on the basis of a computer program installed with files received through the network 170.

The processor 220 may be configured to process instructions of a computer program by performing fundamental arithmetic, logic, and input/output operations. The instructions may be provided to the processor 220 by the memory 210 or the communication interface 230. For example, the processor 220 may be configured to execute an instruction received in accordance with program code stored in a storage device such as the memory 210.

The communication interface 230 may provide a function for the computing device 200 to communicate with other devices (e.g., the above-described storage devices) through the network 170. For example, a request, an instruction, data, a file, etc. generated by the processor 220 of the computing device 200 in accordance with program code stored in a storage device, such as the memory 210, may be transmitted to other devices through the network 170 under the control of the communication interface 230. In reverse, a signal, an instruction, data, a file, etc. of another device may be passed through the network 170 and received by the computing device 200 through the communication interface 230 of the computing device 200. A signal, an instruction, data, etc. received through the communication interface 230 may be transmitted to the processor 220 or the memory 210, and a file and the like may be stored in a storage medium (the above-described permanent storage device) that may be further included in the computing device 200.

The input/output interface 240 may be a device for interfacing with input/output devices 250. As an example, an input device may include a microphone, a keyboard, a mouse, etc., and an output device may include a display, a speaker, etc. As another example, the input/output interface 240 may be a device for interfacing with a device having one integrated function for input and output such as a touchscreen. At least one of the input/output devices 250 may be integrated with the computing device 100. For example, as in a smartphone, a touch screen, a microphone, a speaker, etc. may be included in the computing device 200.

According to other embodiments, the computing device 200 may include a larger or smaller number of components than those of FIG. 2. However, it is unnecessary to clearly show most components of the related art. For example, the computing device 200 may include at least some of the input/output devices 250 or additionally include other components such as a transceiver, a database, etc.

The latency prediction system according to exemplary embodiments of the present disclosure may predict the latency of any deep learning model on a specific edge device on the basis of input information on the deep learning model.

Figure 3:
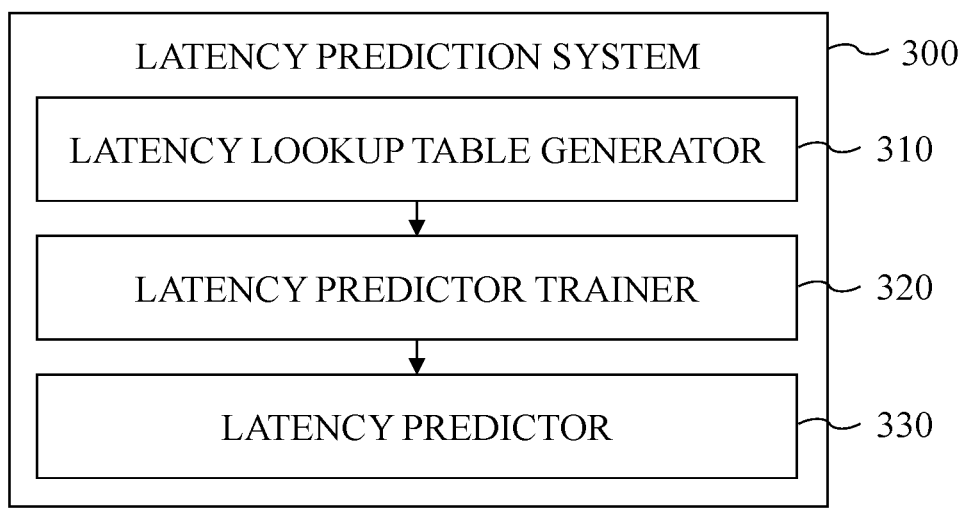
FIG. 3 is a block diagram illustrating an example of an internal configuration of a latency prediction system according to an exemplary embodiment of the present disclosure.
Figure 4:
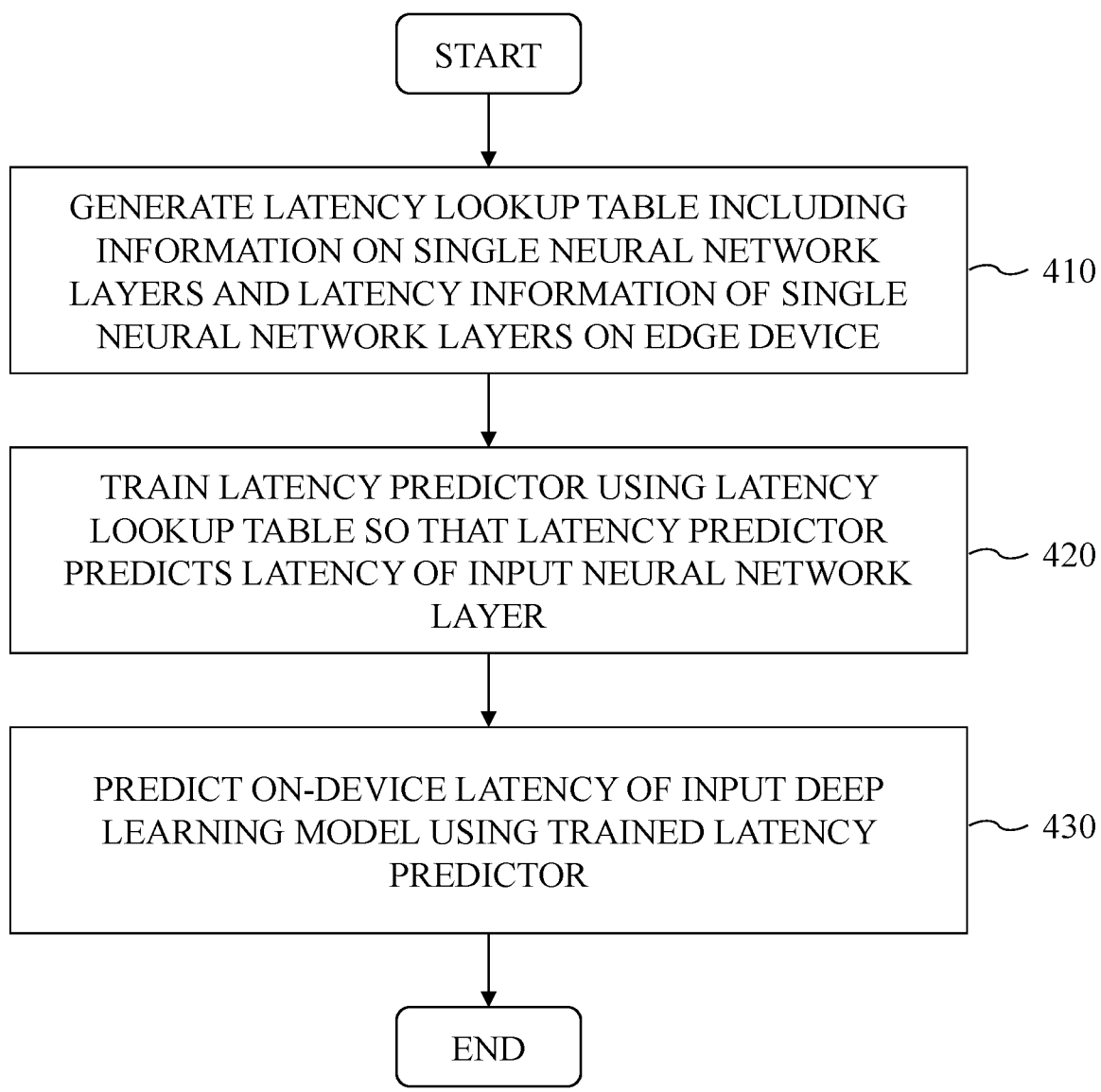
FIG. 4 is a flowchart illustrating an example of a latency prediction method according to an exemplary embodiment of the present disclosure.

FIG. 3 is a block diagram illustrating an example of an internal configuration of a latency prediction system according to an exemplary embodiment of the present disclosure, and FIG. 4 is a flowchart illustrating an example of a latency prediction method according to an exemplary embodiment of the present disclosure. A latency prediction system 300 according to the exemplary embodiment may be implemented by the at least one computing device 200. The latency prediction system 300 of FIG. 3 may include a latency lookup table generator 310, a latency predictor trainer 320, and a latency predictor 330. The latency lookup table generator 310, the latency predictor trainer 320, and the latency predictor 330 may be functional representations of functions in which the processor 220 of the computing device 200 implementing the latency prediction system 300 operates under the control of a computer program. As an example, the processor 220 of the computing device 200 may execute code of the operating system stored in the memory 210 or control instructions in accordance with the code of at least one computer program. The processor 220 may control the computing device 200 to perform operations 410 to 430 included in the method of FIG. 4 in accordance with control instructions provided by code stored in the computing device 200. Here, as functional representations of the processor 220 for performing the operations 410 to 430, the latency lookup table generator 310, the latency predictor trainer 320, and the latency predictor 330 may be used.

In operation 410, the latency lookup table generator 310 may generate a latency lookup table including information on single neural network layers and latency information of the single neural network layers on an edge device.

For example, when a type of edge device to be used is determined, the latency lookup table generator 310 may generate a latency lookup table that contains latency information of each of various single neural network layers on the edge device.

As a specific example, the latency lookup table generator 310 may configure a deep learning model of a single neural network layer to be used as an input of a latency predictor. Here, when various single-neural-network-layer deep learning models are configured, prediction performance of the latency predictor may be improved. Also, the latency lookup table generator 310 may perform a compile process so that the configured single-neural-network-layer deep learning models may be run on the predetermined edge device. In this case, the latency lookup table generator 310 may transmit the compiled single-neural-network-layer deep learning models to the edge device to calculate the latency. When the single-neural-network-layer deep learning models are run on the edge device to measure the latencies, the measured latency values may be transmitted to the latency prediction system 300. In this case, the latency lookup table generator 310 may add the received latency values to the latency lookup table in association with information on the single-neural-network-layer deep learning models, thereby building the latency lookup table. The latency lookup table generator 310 may generate the latency lookup table by measuring the latency of each of the various single-neural-network-layer deep learning models.

The generated latency lookup table may be used for training the latency predictor.

In operation 420, the latency predictor trainer 320 may train the latency predictor using the latency lookup table so that the latency predictor predicts the latency of the input neural network layer.

The latency predictor may be a regression analysis model using a boosting algorithm. A boosting algorithm is an algorithm for improving prediction performance by sequentially training several weak learners and predicting the latency. For example, a gradient boosting algorithm employs a method of continuously reducing the error between an actual value and a predicted value of a previous model using a gradient and is known to show high performance. Such a boosting algorithm shows high efficiency, flexibility, and portability and can prevent overfitting.

After sufficient data is accumulated as training data in the latency lookup table, the latency predictor trainer 320 may start to train the latency predictor which is a regression analysis model using a boosting algorithm. Here, the latency predictor trainer 320 may train the latency predictor so that the latency of a single-neural-network-layer deep learning model may be predicted on the basis of information on the model in the latency lookup table. Meanwhile, the latency predictor trainer 320 may preprocess a latency value of the latency lookup table and an output value of the latency predictor so that the latency predictor may not output a negative value.

In operation 430, the latency predictor 330 may predict the on-device latency of the input deep learning model using the trained latency predictor.

As an example, the latency predictor 330 may generate single-neural-network-layer deep learning models by dividing the input deep learning model into single neural network layers. After that, the latency predictor 330 may input each of the divided single-neural-network-layer deep learning models to the trained latency predictor. The latency predictor may predict and output the latency of the input single-neural-network-layer deep learning model on a specific type of edge device. Here, the latency predictor 330 may predict the on-device latency of the input deep learning model by adding latencies output by the latency predictor.

In this way, the latency prediction system 300 can predict the on-device latency of an input deep learning model without transmitting the deep learning model to measure the latency.

Also, as described above, the latency predictor is a regression analysis model, and thus the latency predictor shows high prediction power even for information that has not been used in the training process. Accordingly, it is possible to predict the on-device latencies of various input deep learning models with high reliability.

The exemplary embodiment has been described with respect to one edge device. However, when the operations (410 to 430) of FIG. 4 are performed for various types of edge devices, a latency lookup table may be generated for each of the various types of edge devices, and a latency predictor that is trained for each of the various types of edge devices may be generated. In this case, the latency predictor 330 can predict the on-device latency of an input deep learning model in accordance with a type of edge device. As an example, the latency prediction system 300 may generate a latency lookup table that stores the latency of each of a plurality of single-neural-network-layer deep learning models with respect to each type of edge device.

FIG. 5 is a diagram illustrating an example of a latency lookup table according to an exemplary embodiment of the present disclosure. FIG. 5 shows an example of a latency lookup table for edge device A. The latency lookup table may include single-neural-network-layer deep learning model information and the latencies of the corresponding single neural network layers actually measured on edge device A. As an example, the single-neural-network-layer deep learning model information may include information about which layer of what kind of deep learning model is the corresponding neural network layer. The latency lookup table stores latencies of neural network layers of various types of deep learning models measured on edge device A in association with each other and thus may be used later as training data for a latency predictor.

Figure 6:
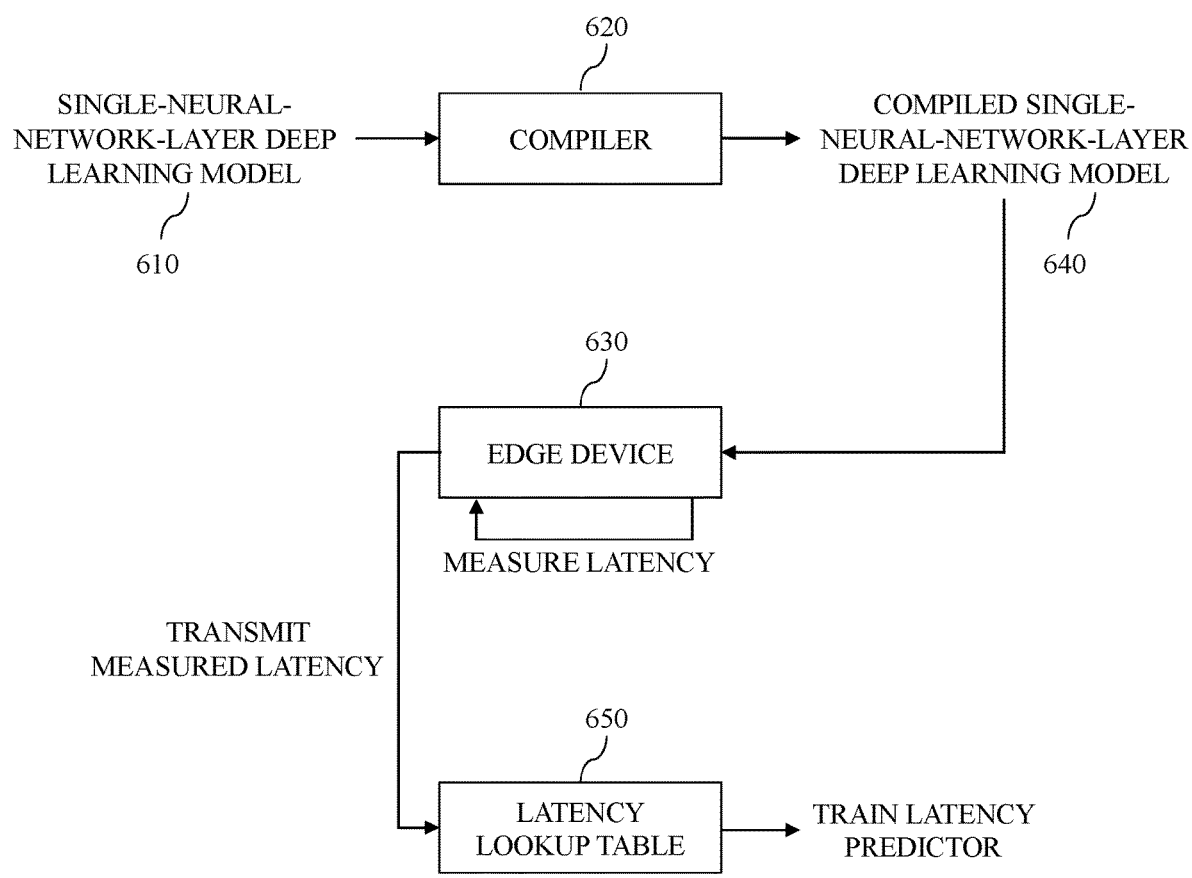
FIG. 6 is a diagram illustrating an example of a process of generating training data according to an exemplary embodiment of the present disclosure.

FIG. 6 is a diagram illustrating an example of a process of generating training data according to an exemplary embodiment of the present disclosure. The latency prediction system 300 or the latency lookup table generator 310 may generate compiled single-neural-network-layer deep learning models 640 for an edge device 630 by compiling single-neural-network-layer deep learning models 610 in accordance with the edge device 630 using a compiler 620. After that, the latency prediction system 300 or the latency lookup table generator 310 may transmit the compiled single-neural-network-layer deep learning models 640 to the edge device 630 to calculate the latencies of the compiled single-neural-network-layer deep learning models 640 on the edge device 630. The edge device 630 may measure the latencies of the compiled single-neural-network-layer deep learning models 640. The measured latencies may be transmitted to the latency prediction system 300, and the latency prediction system 300 or the latency lookup table generator 310 may store the received latencies in a latency lookup table 650. Here, the latencies may be stored in the latency lookup table 650 in association with information on the corresponding single-neural-network-layer deep learning models 610.

When the latency lookup table 650 is generated by measuring the latencies of single neural network layers of various deep learning models, the latency lookup table 650 may be used as training data for a latency predictor. In other words, a latency predictor may be trained to output the latency value of a specific single-neural-network-layer deep learning model. When a latency predictor is trained, it is possible to predict the on-device latency of a deep learning model using the trained latency predictor.

Figure 7:
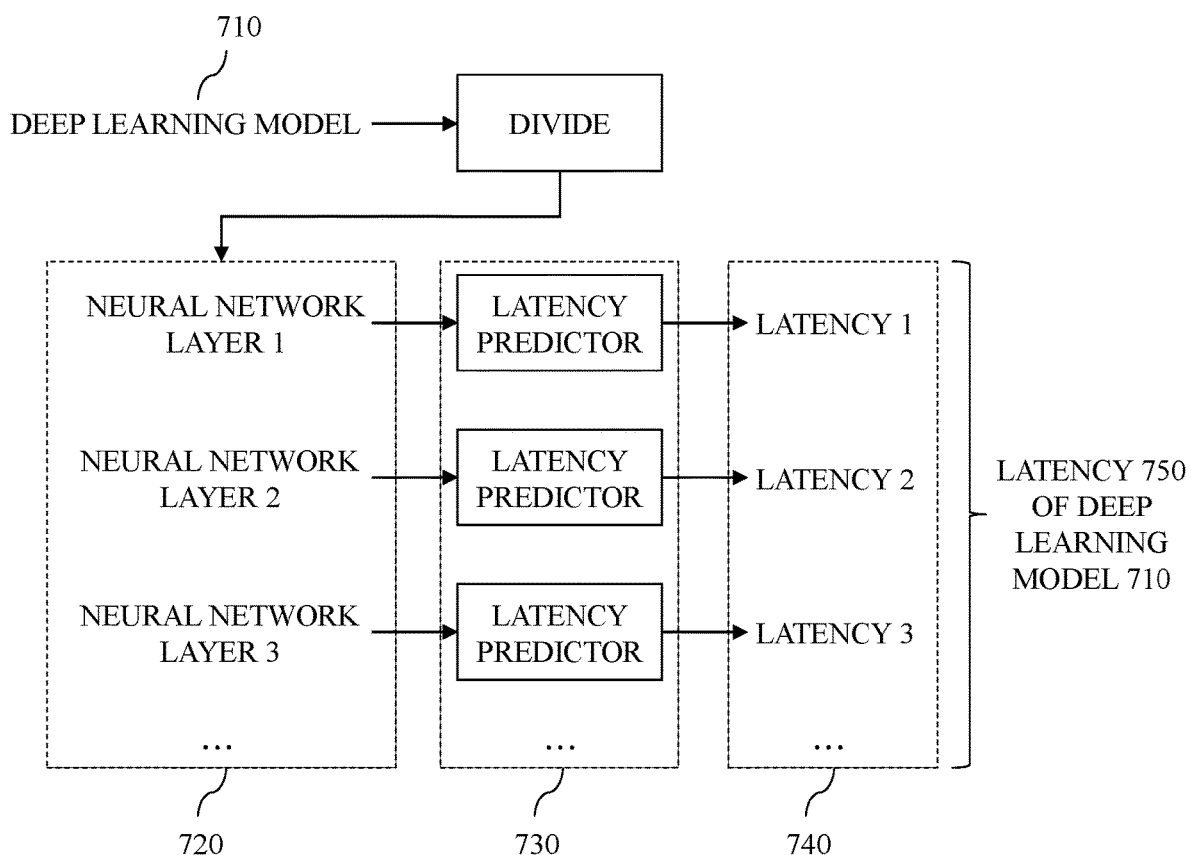
FIG. 7 is a diagram illustrating an example of a process of predicting latency using a latency predictor according to an exemplary embodiment of the present disclosure.

FIG. 7 is a diagram illustrating an example of a process of predicting latency using a latency predictor according to an exemplary embodiment of the present disclosure. When a deep learning model 710 is input, the latency prediction system 300 or the latency predictor 330 may divide the input deep learning model 710 into neural network layers and obtain a plurality of neural network layers 720. Each of the plurality of neural network layers 720 may be input to a latency predictor 730, and latencies 740 of the plurality of neural network layers 720 may be output. Here, the sum of the output latencies 740 may be calculated as latency 750 of the deep learning model 710. The exemplary embodiment of FIG. 7 shows an example in which instances of the latency predictor 730 are applied to each of the plurality of neural network layers 720 in parallel.

As described above, according to exemplary embodiments of the present disclosure, it is possible to predict the on-device latency of a deep learning model without having to set an edge device and construct pipelines in practice.

Meanwhile, it is necessary to generate the latency predictor 730 differently depending on characteristics of an edge device on which the latency predictor 730 will be deployed and executed. This is because the latency predictor 730 may be notably degraded in performance or may be inexecutable depending on the characteristics of the edge device. Here, the characteristics of the edge device may include the type of edge device (e.g., a central processing unit (CPU) or a graphics processing unit (GPU)) and the software version of the edge device.

To generate the latency predictor 730 to be executed on a new edge device, new training data corresponding to the new edge device may be required. The training data may be a lookup table (or a latency lookup table). A method of acquiring new training data will be described below with reference to FIG. 8.

Figure 8:
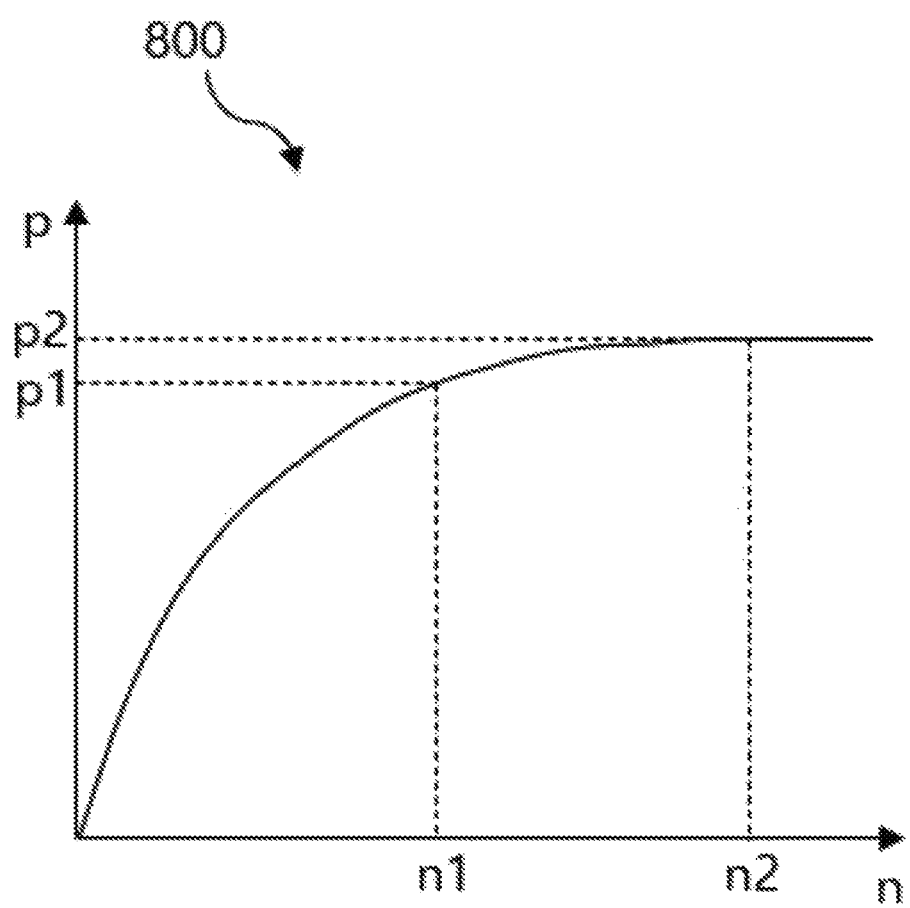
FIG. 8 is a graph illustrating performance of a latency predictor in accordance with the number of pieces of data used in training a latency predictor according to an exemplary embodiment of the present disclosure.

FIG. 8 is a graph illustrating performance of a latency predictor in accordance with the number of pieces of data used in training a latency predictor according to an exemplary embodiment of the present disclosure.

Referring to FIG. 8, the x axis of a graph 800 represents the number n of pieces of data used in training a latency predictor, and the y axis of the graph 800 represents performance of the latency predictor. For example, the performance of the latency predictor may be accuracy. First performance p1 may be 95%, and second performance p2 may be 100% (i.e., the maximum performance). A second number n2 may be twice the first number n1. In other words, when the performance of the latency predictor is lowered by 5%, the number of pieces of training data may be halved.

The computing device 200 may acquire information related to the graph 800 using a first lookup table stored in the memory 210. The computing device 200 may acquire the performance of the latency predictor in accordance with the number of pieces of data while adjusting the number of pieces of data included in the first lookup table. For example, when trained with the first number n1 of pieces of data, the latency predictor may show the first performance p1. When trained with the second number n2 of pieces of data, the latency predictor may show the second performance p2.

The computing device 200 may acquire an optimal number of pieces of data on the basis of the graph 800 and store the data in the memory 210. For example, the computing device 200 may acquire the first number n1 of pieces of data as an optimal number of pieces of data. The computing device 200 may determine an optimal number of pieces of data on the basis of at least one of the performance of the latency predictor or the number of pieces of training data. For example, the computing device 200 may determine the number of pieces of data corresponding to predetermined target performance as an optimal number of pieces of data.

The computing device 200 may generate a new lookup table for training a new latency predictor on the basis of an optical number of pieces of data stored in the memory 210. Specifically, the computing device 200 may generate a lookup table having an optimal number of pieces of data. For example, the computing device 200 may generate a second lookup table including the number n1 of pieces of data. The computing device 200 may acquire a second latency predictor trained on the basis of the second lookup table. In this way, the computing device 200 can minimize resources required for generating a lookup table by generating a lookup table having an optimal number of pieces of data.

Meanwhile, latency measured using an edge device may include an overhead. For example, latency corresponding to each single neural network layer in FIG. 5 may be a value including an overhead. Here, when the computing device 200 calculates the overall latency of the deep learning model by adding the latency corresponding to each single neural network layer, the overhead is repeatedly added to the overall latency, and thus an error of the overall latency may increase.

For example, when a deep learning model includes a first neural network layer and a second neural network layer, first latency La of the first neural network layer may be represented as [Equation 1], and second latency Lb of the second neural network layer may be represented as [Equation 2]. The first latency La and the second latency Lb are latency measured on an edge device, L(a) and L(b) are net latency, and "o.h." represents an overhead.

$$La = L(a) + o.h. \quad [\text{Equation 1}]$$

$$Lb = L(b) + o.h. \quad [\text{Equation 2}]$$

When the computing device 200 calculates the overall latency of the deep learning model by adding the first latency La and the second latency Lb, the overall latency includes two overheads (i.e., L(a)+L(b)+2*o.h.). On the other hand, the actual latency of the deep learning model has only one overhead (e.g., L(a)+L(b)+o.h.). Accordingly, the sum of the latency differs from the actual latency. A method of reducing the latency error will be described below.

First, the computing device 200 may acquire the overhead on the basis of [Equation 3] and [Equation 4].

$$Lc = L(a+b) + o.h. \quad [\text{Equation 3}]$$

$$o.h. = La + Lb - Lc \quad [\text{Equation 4}]$$

Third latency Lc is latency measured when the edge device executes the first neural network layer and the second neural network layer, and L(a+b) is net latency of the first neural network layer and the second neural network layer. The computing device 200 may acquire the overhead o.h. by subtracting the third latency Lc from the sum of the first latency La and the second latency Lb.

Figure 9:
FIG. 9 is a table illustrating a method of reducing a latency error according to an exemplary embodiment of the present disclosure.

FIG. 9 is a table illustrating a method of reducing a latency error according to an exemplary embodiment of the present disclosure.

Referring to FIG. 9, the computing device 200 may correct measured latency L1, L2, and L3 corresponding to single neural network layers of a deep learning model. The measured latency L1, L2, and L3 is latency measured when an edge device executes a single neural network layer. The computing device 200 may acquire a corrected lookup table 900 by subtracting an overhead o.h. from the measured latency L1, L2, and L3.

The computing device 200 may train a latency predictor using the corrected lookup table 900. Accordingly, the computing device 200 can acquire a latency predictor showing increased accuracy.

Meanwhile, FIG. 9 illustrates an example in which the overhead o.h. is used in the training operation of a latency predictor. According to another exemplary embodiment, the computing device 200 may use the overhead o.h. in the inference operation of a latency predictor. For example, the computing device 200 may acquire corrected latency by subtracting the overhead o.h. from predicted latency output by a latency predictor.

Figure 10:
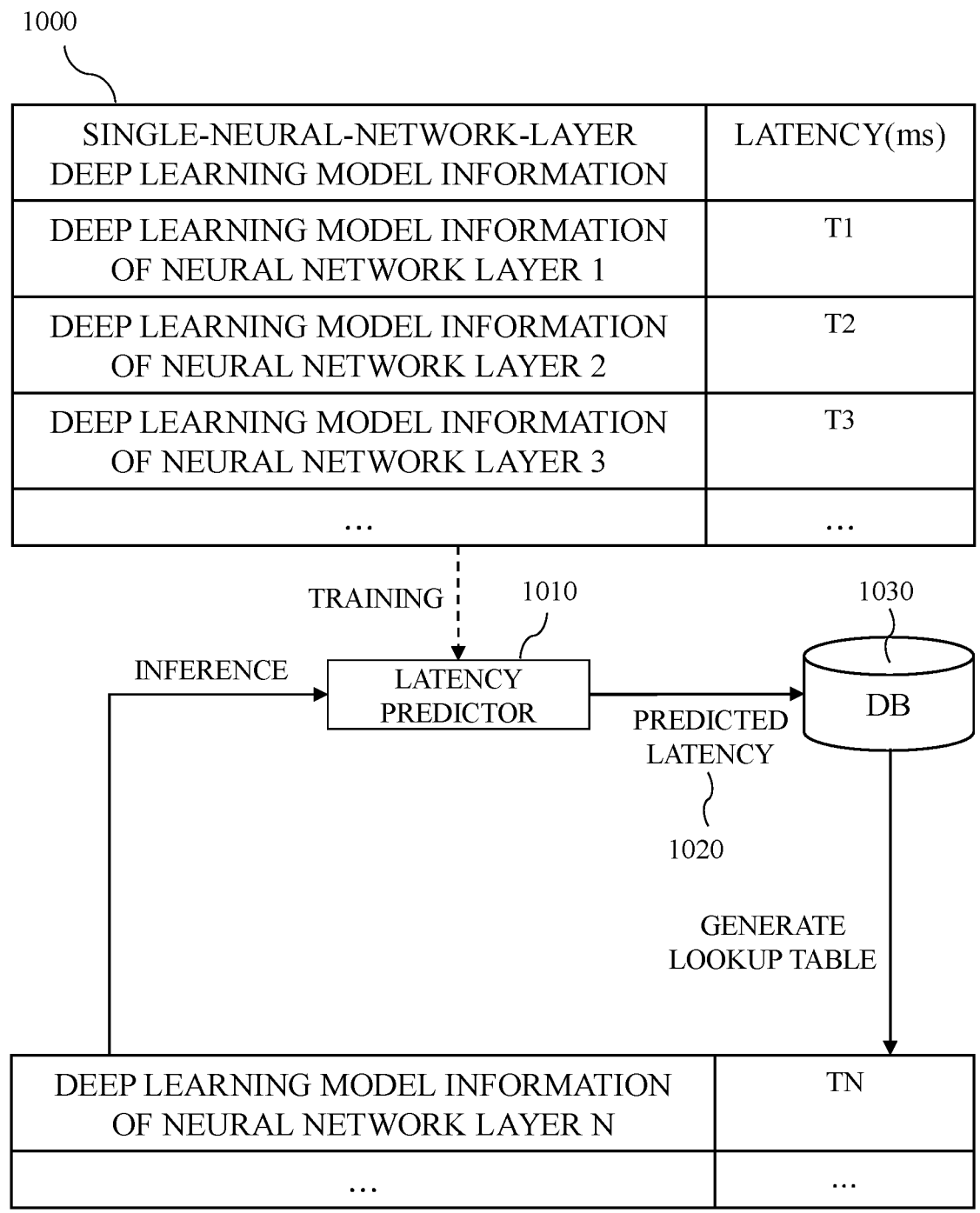
FIG. 10 is a diagram illustrating a lookup table generation method according to an exemplary embodiment of the present disclosure.

FIG. 10 is a diagram illustrating a lookup table generation method according to an exemplary embodiment of the present disclosure.

Referring to FIG. 10, the computing device 200 may train a latency predictor 1010 using a lookup table 1000. For example, the computing device 200 may train the latency predictor 1010 using deep learning model information and latency T1 of neural network layer 1, deep learning model information and latency T2 of neural network layer 2, and deep learning model information and latency T3 of neural network layer 3.

Meanwhile, it may be inefficient to measure latency of all types of single-neural-network-layer deep learning models using an edge device. Because it may require a lot of time and resources. To handle this issue, the computing device 200 may build the lookup table 1000 on the basis of predicted latency 1020 output by the trained latency predictor 1010.

For example, the computing device 200 may acquire latency TN by inputting deep learning model information of neural network layer N to the latency predictor 1010. The computing device 200 may store the latency TN in a database 1030. In the database 1030, single-neural-network-layer deep learning model information input to the latency predictor 1010 may be stored in association with the predicted latency 1020. The database 1030 may be stored in the memory 210.

Meanwhile, the computing device 200 may determine whether input neural network layer information is information included in the lookup table 1000. When the input neural network layer information is information not included in the lookup table 1000, the computing device 200 may store the input neural network layer information and the input latency of the neural network layer in the lookup table 1000. On the other hand, when the input neural network layer information is information included in the lookup table 1000, the computing device 200 may not store the input neural network layer information and the input latency of the neural network layer in the database 1030.

The computing device 200 may generate the lookup table 1000 using the predicted latency 1020 stored in the database 1030. For example, the computing device 200 may add the deep learning model information of neural network layer N and the latency TN based on the deep learning model information of neural network layer N to the lookup table 1000. Accordingly, the number of pieces of data included in the lookup table 1000 may increase. The computing device 200 may generate a new lookup table including the deep learning model information of neural network layer N and the latency TN based on the deep learning model information of neural network layer N.

Figure 11:
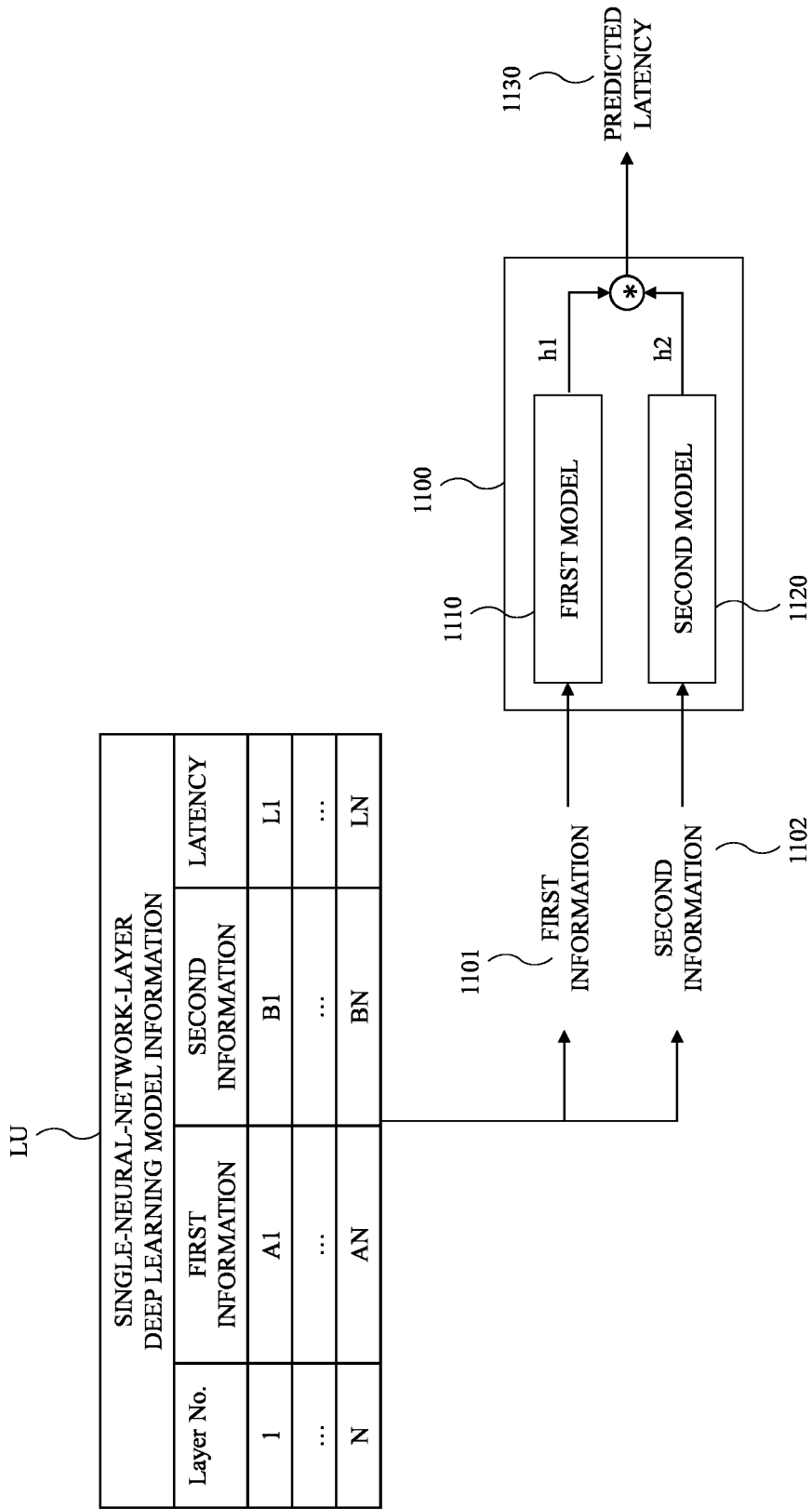
FIG. 11 is a diagram illustrating a method of training a latency predictor according to an exemplary embodiment of the present disclosure.

FIG. 11 is a diagram illustrating a method of training a latency predictor according to an exemplary embodiment of the present disclosure.

Referring to FIG. 11, a lookup table LU may include information on each of a plurality of single neural network layers. The information on the single neural network layers may include a first type of information and a second type of information. The first type of information may include the size of input data (e.g., an image resolution) for each layer and an inference batch size. The second type of information may include architecture information of each layer. For example, the architecture information may include the number of layers and information on each layer structure. The information on each layer structure may include a type of layer (e.g., convolution layer) and a kernel size and a pooling size of the layer. For example, first information 1101 may be the first type of information, and second information 1102 may be the second type of information.

The computing device 200 may train a latency predictor 1100 using the lookup table LU. The latency predictor 1100 may include a first model 1110 to which the first information 1101 is input and a second model 1120 to which the second information 1102 is input. For example, the first model 1110 may be a linear regression model. The second model 1120 may be a non-linear model (e.g., XGBoost or a deep neural network (DNN)). The first model 1110 may receive the first information 1101 and output a first feature value h1. The second model 1120 may receive the second information 1102 and output a second feature value h2. The latency predictor 1100 may acquire a predicted latency 1130 on the basis of the first feature value h1 and the second feature value h2. The computing device 200 may update weights of the first model 1110 and/or the second model 1120 of the latency predictor 1100 so that the difference between the predicted latency 1130 and latency stored in the lookup table LU is minimized.

Figure 12:
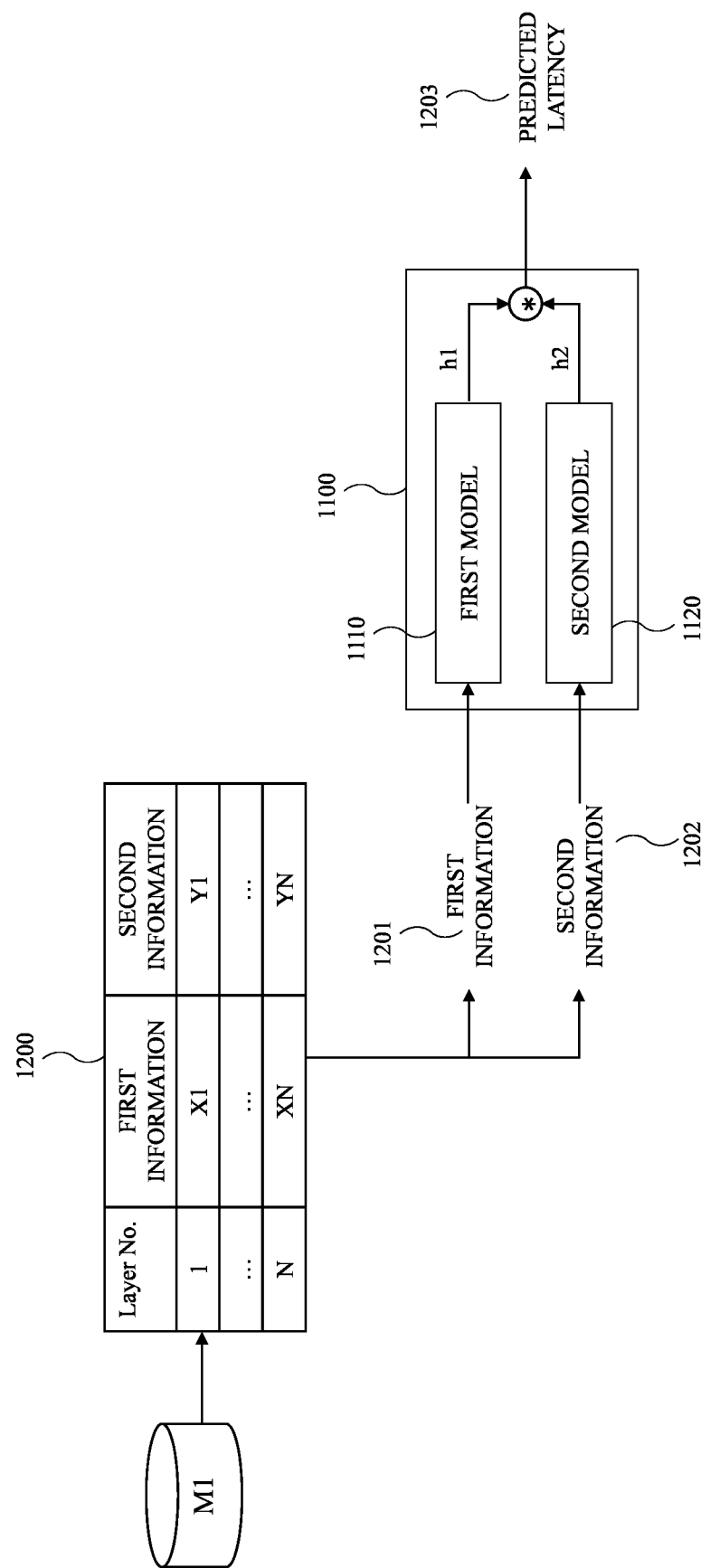
FIG. 12 is a diagram illustrating a method of predicting latency using a latency predictor according to an exemplary embodiment of the present disclosure.

FIG. 12 is a diagram illustrating a method of predicting latency using a latency predictor according to an exemplary embodiment of the present disclosure.

Referring to FIG. 12, the computing device 200 may acquire a first deep learning model M1. The computing device 200 may acquire information 1200 on the first deep learning model M1 by analyzing the first deep learning model m1. The information 1200 on the first deep learning model M1 may include first information 1201 and second information 1202. The first information 1201 may be the above-described first type of information, and the second information 1202 may be the above-described second type of information. For example, the first information 1201 may include the size of input data (e.g., an image resolution) for each layer included in the first deep learning model M1 and an inference batch size. The second information 1202 may include architecture information of each layer included in the first deep learning model M1.

The computing device 200 may acquire predicted latency 1203 by inputting the first information 1201 and the second information 1202 to the latency predictor 1100. The first model 1110 may receive the first information 1201 and output a first feature value h1, and the second model 1120 may receive the second information 1202 and output a second feature value h2. The latency predictor 1100 may acquire the predicted latency 1203 on the basis of the first feature value h1 and the second feature value h2. For example, the latency predictor 1100 may perform a convolution operation on the first feature value h1 and the second feature value h2.

Meanwhile, the computing device 200 may classify the information 1200 on the first deep learning model M1 as the first information 1201 and the second information 1202. Then, the computing device 200 may select a model corresponding to each piece of information and input the information to the selected model. For example, the computing device 200 may select the first model 1110 as a model corresponding to the first information 1201 and input the first information 1201 to the first model 1110. Also, the computing device 200 may select the second model 1120 as a model corresponding to the second information 1202 and input the second information 1202 to the second model 1120.

Alternatively, classification as the first information 1201 and the second information 1202 may be performed by the latency predictor 1100. Although not shown in the drawing, the latency predictor 1100 may include a preprocessor for classifying the information 1200 on the first deep learning model M1 into the first information 1201 and the second information 1202. The latency predictor 1100 may select a model corresponding to each piece of information and input the information to the selected model.

According to the above-described various embodiments, a user can acquire the on-device latency of a deep learning model without having to set an edge device and construct pipelines in practice.

The above-described system or device may be implemented as hardware components or a combination of hardware components and software components. For example, the device and components described in the exemplary embodiments may be implemented using at least one general-use computer or special-purpose computer, for example, a processor, a controller, an arithmetic logic unit (ALU), a digital signal processor, a microcomputer, a field programmable gate array (FPGA), a programmable logic unit (PLU), a microprocessor, or other devices capable of executing and responding to instructions. The processor may execute an operating system (OS) and at least one software application executed on the OS. In addition, the processor may access, store, manipulate, process, and generate data in response to the execution of software. For convenience of understanding, it may be described that one processor is used, but those of ordinary skill in the art may understand that the processor may include a plurality of processing elements and/or a plurality of types of processing elements. For example, the processor may include a plurality of processors or may include one processor and one controller. Also, the processor may have another processing configuration such as a parallel processor.

Software may include a computer program, code, instructions, or at least one combination thereof and may configure the processor to operate as desired or independently or collectively instruct the processor. Software and/or data may be permanently or temporarily embodied in a certain type of machine, component, physical equipment, virtual equipment, or a computer storage medium or device to be interpreted by a processor or to provide instructions or data to the processor. Software may be distributed on a computer system connected through a network and may be stored or executed in a distributed manner. Software and data may be stored in at least one computer-readable recording medium.

The method according to an exemplary embodiment may be implemented in the form of program instructions executed by various computing devices and recorded in a computer-readable recording medium. The computer-readable recording medium may include program instructions, data files, data structures, etc. solely or in combination. The medium may continuously store computer-executable programs or temporarily store the same for execution or download. The medium may be various types of recording devices or storage devices in a form in which one or a plurality of hardware components are combined. Without being limited to media directly connected to a computer system, the medium may be distributed over a network. Examples of the medium may include magnetic media, such as a hard disk, a floppy disk, and magnetic tape, optical media, such as a CD-ROM and a DVD, magneto-optical media, such as a floptical disk, and media configured to store program instructions such as a ROM, a RAM, a flash memory, etc. Other examples of the medium may include recording media and storage media managed by an application store that distributes applications or a site, a server, etc. that supplies and distributes various other types of software. Examples of program instructions may include machine language code produced by a compiler and high-level language code executable by a computer using an interpreter.

Although the present disclosure has been described with reference to the limited number of exemplary embodiments and drawings, it will be apparent to those of ordinary skill in the art that various modifications and alterations can be made from the above description. For example, suitable results may be achieved even when the described techniques are performed in a different order and/or even when components of a described system, architecture, device, circuit, etc. are combined in a form different from a described method or replaced or supplemented by other components or equivalents.

Therefore, other implementations, other embodiments, and equivalents to the claims also fall into the scope of the following claims.

What is claimed is:

1. A latency prediction method performed by a computing device including at least one processor, the latency prediction method comprising:
receiving, by the at least one processor, a deep learning model; and
deriving, by the at least one processor, an on-device latency of each of a plurality of single neural network layer models by inputting the plurality of single neural network layer models included in the received deep learning model to a latency predictor which is trained based on a latency lookup table;
predicting, by the at least one processor, an on-device latency of the received deep learning model by summing the on-device latency of each of the plurality of single neural network layer models,
wherein the latency lookup table includes information on each of predetermined single neural network layer models and a latency of each of the predetermined single neural network layer models,
wherein the latency of each of the predetermined single neural network layer models has a value derived by subtracting an overhead required for executing each of the predetermined single neural network layer models on an edge device from a latency measured by executing each of the predetermined single neural network layer models on the edge device, and
wherein the overhead required for executing each of the predetermined single neural network layer models on the edge device is the same.

2. The latency prediction method of claim 1, wherein the overhead is derived by subtracting a third latency from a sum of a first latency and a second latency,
wherein the first latency is measured by executing a first predetermined single neural network layer models on the edge device,
wherein the second latency is measured by executing a second predetermined single neural network layer models on the edge device, and
wherein the third latency is measured by executing a model including the first predetermined single neural network layer model and the second predetermined single neural network layer model on the edge device.

3. The latency prediction method of claim 1, wherein the predicting the on-device latency of the received deep learning model comprises,
  summing the on-device latency of each of the plurality of single neural network layer models, and
  correcting the summed on-device latency using the overhead.

4. The latency prediction method of claim 1, wherein the latency lookup table is generated to store a latency of each of the predetermined single neural network layer models for each type of edge device.

5. The latency prediction method of claim 1, wherein the trained latency predictor is trained based on a preprocessed latency value of the latency lookup table and a preprocessed output value of the latency predictor so that the trained latency predictor does not output a negative value.

6. The latency prediction method of claim 1, further comprising:
  generating the plurality of single neural network layer models by decomposing the received deep learning model into single neural network layers.

7. The latency prediction method of claim 1, wherein the trained latency predictor includes a regression analysis model using a boosting algorithm.

8. A non-transitory computer-readable medium storing at least one program configured to be executed by at least one processor of a computing device, the at least one program including instructions for:
  receiving, by the at least one processor, a deep learning model; and
  deriving, by the at least one processor, an on-device latency of each of a plurality of single neural network layer models by inputting the plurality of single neural network layer models included in the received deep learning model to a latency predictor which is trained based on a latency lookup table;
  predicting, by the at least one processor, an on-device latency of the received deep learning model by summing the on-device latency of each of the plurality of single neural network layer models,
  wherein the latency lookup table includes information on each of predetermined single neural network layer models and a latency of each of the predetermined single neural network layer models,
  wherein the latency of each of the predetermined single neural network layer models has a value derived by subtracting an overhead required for executing each of the predetermined single neural network layer models on an edge device from a latency measured by executing each of the predetermined single neural network layer models on the edge device, and
  wherein the overhead required for executing each of the predetermined single neural network layer models on the edge device is the same.

9. A computing device comprising at least one processor implemented to execute instructions readable by a computing device,
  wherein the at least one processor is configured to,
  derive an on-device latency of each of a plurality of single neural network layer models by inputting the plurality of single neural network layer models included in the received deep learning model to a latency predictor which is trained based on a latency lookup table, and
  predict an on-device latency of the received deep learning model by summing the on-device latency of each of the plurality of single neural network layer models,
  wherein the latency lookup table includes information on each of predetermined single neural network layer models and a latency of each of the predetermined single neural network layer models,
  wherein the latency of each of the predetermined single neural network layer models has a value derived by subtracting an overhead required for executing each of the predetermined single neural network layer models on an edge device from a latency measured by executing each of the predetermined single neural network layer models on the edge device, and
  wherein the overhead required for executing each of the predetermined single neural network layer models on the edge device is the same.

10. The computing device of claim 9, wherein the overhead is derived by subtracting a third latency from a sum of a first latency and a second latency,
  wherein the first latency is measured by executing a first predetermined single neural network layer models on the edge device,
  wherein the second latency is measured by executing a second predetermined single neural network layer models on the edge device, and
  wherein the third latency is measured by executing a model including the first predetermined single neural network layer model and the second predetermined single neural network layer model on the edge device.

11. The computing device of claim 9, wherein the at least one processor is further configured to,
  sum the on-device latency of each of the plurality of single neural network layer models, and
  correct the summed on-device latency using the overhead.

12. The computing device of claim 9, wherein the latency lookup table is generated to store a latency of each of the predetermined single neural network layer models for each type of edge device.

13. The computing device of claim 9, wherein the trained latency predictor is trained based on a preprocessed latency value of the latency lookup table and a preprocessed output value of the latency predictor so that the trained latency predictor does not output a negative value.

14. The computing device of claim 9, wherein the at least one processor is further configured to,
  generate the plurality of single neural network layer models by decomposing the received deep learning model into single neural network layers.

15. The computing device of claim 9, wherein the latency lookup table includes a first type of information and a second type of information on the single neural network layers, and
  the trained latency predictor includes a first model to which the first type of information is input and a second model to which the second type of information is input.

16. The computing device of claim 15, wherein the first type of information includes at least one of sizes of input data for the single neural network layers or batch sizes of the single neural network layers, and
  the second type of information includes architecture information of the single neural network layers.

17. The computing device of claim 15, wherein the first model includes a linear regression mode, and
  the second model includes a non-linear regression model.

18. The computing device of claim 15, wherein the trained latency predictor includes a preprocessor configured to identify the first type of information and the second type of information from information on the received deep learning model.

19. The computing device of claim 9, wherein the at least one processor acquires an overhead corresponding to the received deep learning model and corrects the predicted on-device latency on the basis of the overhead.

\* \* \* \* \*